United States Patent Office 3,154,566
Patented Oct. 27, 1964

---

3,154,566
NOVEL 3-HALO-4-HYDROXY-4-HALOMETHYL TETRAHYDROPYRANS
Erwin Steininger, Frankfurt am Main-Sossenheim, Germany, assignor, by mesne assignments, to Socony Mobil Oil Company, Inc., New York, N.Y., a corporation of New York
No Drawing. Filed Dec. 14, 1962, Ser. No. 244,580
8 Claims. (Cl. 260—345.9)

The present invention relates to novel chemical compounds, namely 3-halo-4-hydroxy-4-halomethyl tetrahydropyrans, and their preparation from reaction of an aldehyde with an appropriate 3-halo-2-halomethyl propene and, more particularly, the preparation of 3-chloro-4-hydroxy-4-chloromethyl tetrahydropyran by reaction of formaldehyde with 3-chloro-2-chloromethyl propene. The novel tetrahydropyrans embodied herein have the following structure:

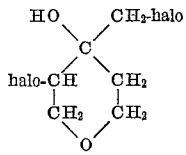

wherein halo is a halogen atom.

This invention is based on the discovery that the novel compounds embodied herein can be produced by reacting an appropriate aldehyde with a 3-halo-2-halomethyl propene in the presence of an acidic catalyst. Examples of such propenes include 3-bromo-2-bromomethyl propene, 3-iodo-2-iodo-methyl propene, and the like.

The reaction is carried out by use of at least about two moles of an aldehyde per mole of the 3-halo-2-halomethyl propene and, preferably, a substantial excess of the aldehyde, such as on the order of six or more moles of the aldehyde (as in the form of paraformaldehyde) per mole of the 3-halo-2-halomethyl propene. The reaction is carried out at elevated temperatures, as for example, about 90° C., and as aforesaid, in presence of an acidic catalyst.

Acidic catalysts suitable for the reaction embodied herein include aqueous inorganic acids, examples of which include sulfuric acid and hydrochloric acid, and which may be promoted with inorganic metal halides, such as zinc chloride, and others. In use of sulfuric acid, which represents a preferred embodiment, for practice of this invention, substantial yields of the desired product can be obtained by use of the acid in a concentration of at least about 50%, more preferably, from more than about 50% to about 85% and, still more preferably about 80%, coupled with use of the aldehyde in excess of two moles per mole of the 3-halo-2-halomethyl-propene.

From the process embodied herein, the acidic catalyst can be recovered following the reaction and used for further reactions as can be the aldehyde that is not consumed.

Desirably, the reaction is carried out in the presence of a liquid reaction medium, typified by substances such as halogenated hydrocarbons, oxygenated hydrocarbons, e.g., ethers, and specifically, substances such as ethylene chloride and trioxymethylene. Suitable for such a purpose are liquids that are inert under the conditions of the process embodied herein and possess suitable solubility characteristics for the reactants so as to provide a homogenous reaction mixture.

In order to further describe the invention, the following embodiment is set forth for purposes of illustration and not limitation.

*Example 1*

1250 grams (10 moles) 3-chloro-2-chloromethyl-propene, 1800 grams (60 moles) paraformaldehyde and 600 grams ethylene chloride were heated with stirring at 90° C. followed by addition of 1100 grams of 80% sulfuric acid. An exothermic reaction occurred that raised the temperature to about 100° C. and remained at that temperature for about two hours, following which the temperature began to drop when the aldehyde completely dissolved. Upon separation of the reaction mixture into two layers, the organic phase was washed twice with water, dried and distilled. The crude product (1850 grams) obtained at between 110 and 140° C. at 12 mm. Hg, was fractionated and the fraction above 122° C. at 12 mm. Hg were recrystallized twice from water yielding 204 grams (11% of theory) of 3-chloro-4-chloromethyl-tetrahydropyran. (M.P., 104.5° C.) Elemental analysis of the product gave the following results:

|  | Calculated | Found |
|---|---|---|
| Molecular Weight $C_6H_{10}Cl_2O_2$ | 185.1 | 187 |
| C _____percent__ | 38.9 | 38.9 |
| H _____do____ | 5.44 | 5.61 |
| Cl _____do____ | 38.3 | 38.6 |

The novel tetrahydropyrans embodied herein possess utility as cross-linking agents for curing of resins, particularly polyaldehydes, and as intermediates for synthesis of hydropyran epoxides by epoxidation by halide abstraction and which epoxides are useful for preparation of solid polyethers that are chemically inert and possess excellent solvent resistance.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. 3-halo-4-hydroxy-4-halomethyl tetrahydropyran.
2. 3-chloro-4-hydroxy-4-chloromethyl tetrahydropyran.
3. A method for preparation of a 3-halo-4-hydroxy-4-halomethyl tetrahydropyran, which comprises reacting a 3-halo-2-halomethyl propene with an aldehyde from the group consisting of paraformaldehyde and formaldehyde in the presence of an acidic catalyst, said reaction being carried out by use of a ratio of one mole of the 3-halo-2-halomethyl propene to at least two moles of the aldehyde.
4. A method, as defined in claim 3, wherein the acidic catalyst is sulfuric acid of a concentration of more than about 50% and the 3-halo-2-halomethyl propene is 3-chloro-2-chloromethyl propene.
5. A method, as defined in claim 4, wherein the acidic catalyst is sulfuric acid of a concentration of more than about 50 to about 85%.
6. A method, as defined in claim 3, in which the reaction is carried out in the presence of an inert liquid medium.

7. A method, as defined in claim 6, wherein the liquid medium is from the group consisting of ethylene chloride and trioxymethylene.

8. A method for preparation of 3-chloro-4-hydroxy-4-chloromethyl tetrahydropyran which comprises reacting 3-chloro-2-chloromethyl propene with formaldehyde in the presence of an aqueous acidic catalyst, said reaction being carried out by use of a ratio of one mole of said propene to at least two moles of the aldehyde, fractionating the resulting organic phase to obtain a fraction boiling above 122° C. at 12 mm. Hg, and recovering 3-chloro-4-hydroxy-4-chloromethyl tetrahydropyran by crystallization from water from said fraction.

References Cited in the file of this patent

Arundale et al.: Chemical Reviews, vol 51, pages 547-551 (1952). QD1. A563.